(12) United States Patent
Bharatia

(10) Patent No.: US 11,153,744 B2
(45) Date of Patent: Oct. 19, 2021

(54) ROAMING SUPPORT FOR NEXT GENERATION SLICE ARCHITECTURE

(71) Applicant: Samsung Electronics Co., Ltd, Suwon-si (KR)

(72) Inventor: Jayshree A. Bharatia, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/594,278

(22) Filed: May 12, 2017

(65) Prior Publication Data

US 2017/0332226 A1    Nov. 16, 2017

Related U.S. Application Data

(60) Provisional application No. 62/337,068, filed on May 16, 2016, provisional application No. 62/373,510, (Continued)

(51) Int. Cl.
*H04W 8/06* (2009.01)
*H04W 76/10* (2018.01)
*H04W 76/12* (2018.01)
*H04W 8/04* (2009.01)
*H04W 12/06* (2021.01)
*H04W 12/08* (2021.01)
*H04W 48/18* (2009.01)
(Continued)

(52) U.S. Cl.
CPC ............... *H04W 8/06* (2013.01); *H04W 8/04* (2013.01); *H04W 12/06* (2013.01); *H04W 12/08* (2013.01); *H04W 48/18* (2013.01); *H04W 76/10* (2018.02); *H04W 76/12* (2018.02); *H04W 8/12* (2013.01); *H04W 76/20* (2018.02); *H04W 76/30* (2018.02)

(58) Field of Classification Search
CPC ......... H04W 8/04; H04W 8/06; H04W 76/12; H04W 12/06
USPC ....................................................... 455/433
See application file for complete search history.

(56) References Cited

U.S. PATENT DOCUMENTS

2013/0303114 A1    11/2013    Ahmad et al.
2017/0289791 A1*   10/2017    Yoo .................... H04W 60/04
(Continued)

OTHER PUBLICATIONS

3GPP TR 21.905 V14.0.0, Technical Report, 3rd Generation Partnership Project; Technical Specification Group Services and System Aspects; Vocabulary for 3GPP Specifications (Release 14) Mar. 2017—66 Pages.
(Continued)

*Primary Examiner* — Chuck Huynh

(57) ABSTRACT

A core network includes a home network and a visiting network. The home network includes a first slice selector module configured to select a first slice and a first network function selection module configured to select a network function within the first slice. The visiting network includes a second slice selector module configured to communicate with the first slice selector and select a second slice, a second network function selection module configured to select a network function within the second slice, and a common core network function (CCNF) module. The CCNF module communicates with the second slice selector module to receive an identity of the first slice and an identity of the second slice, assign a temporary identifier, and transmit the temporary identifier to a user equipment.

16 Claims, 11 Drawing Sheets

Related U.S. Application Data filed on Aug. 11, 2016, provisional application No. 62/401,611, filed on Sep. 29, 2016.

(51) Int. Cl.

| | |
|---|---|
| *H04W 76/20* | (2018.01) |
| *H04W 76/30* | (2018.01) |
| *H04W 8/12* | (2009.01) |

(56) References Cited

U.S. PATENT DOCUMENTS

| | | | | |
|---|---|---|---|---|
| 2017/0318450 | A1* | 11/2017 | Salkintzis | H04W 8/02 |
| 2018/0176858 | A1* | 6/2018 | Wang | H04W 76/11 |
| 2019/0020996 | A1* | 1/2019 | Zhang | H04W 8/12 |
| 2019/0045351 | A1* | 2/2019 | Zee | H04W 48/18 |

OTHER PUBLICATIONS

3GPP TS 23502 V0.2.0 Technical Specification, 3rd Generation Partnership Project; Technical Specification Group Services and System Aspects; Procedures for the 5G System; Stage 2 (Release 15)—Feb. 2017—71 Pages.

3GPP TR 23.799 V14.0.0 Technical Report, 3rd Generation Partnership Project; Technical Specification Group Services and System Aspects; Study on Architecture for Next Generation System (Release 14)—Dec. 2016—522 Pages.

International Search Report dated Aug. 28, 2017 in connection with International Patent Application No. PCT/KR2017/005055.

Written Opinion of the International Searching Authority dated Aug. 28, 2017 in connection with International Patent Application No. PCT/KR2017/005055.

Samsung, "The impact of network slicing on RAN", 3GPP TSG-RAN WG3 #91 bis, Apr. 11-15, 2016, 4 pages, R3-160689.

LG Electronics Inc., "Consideration on network slice selection", 3GPP TSG-RAN WG3 Meeting #91 bis, 4 pages, R3-160755.

Nokia, Alcatel-Lucent Shanghai Bell, "Key principles for Slice Selection Support in RAN", 3GPP TSG-RAN WG3 Meeting #91bis, Apr. 11-15, 2016, 6 pages, R3-160735.

NTT DOCOMO, "Solution to support a UE with simultaneous connections to multiple Network Slices", SA WG2 Meeting #113AH, Feb. 23-26, 2016, 5 pages, S2-161043.

European Patent Office, "Supplementary Partial European Search Report," Application No. EP17799621.2, dated Dec. 6, 2018, 13 pages.

Huawei, "Key principles for Support Network Slicing in RAN," R3-161133, RAN WG3 Meeting #92, Nanjing, China, May 23-27, 2016, 6 pages.

Huawei, "Network slice selection," R3-161134, RAN WG3 Meeting #92, Nanjing, China, May 23-27, 2016, 4 pages.

ZTE, "NextGen Core Architecture solution for sharing Network Function across multiple Network Slices," S2-162260 (e-mail revision of 1 of S2-162149), SA WG2 Temporary Document, SA WG2 Meeting #114, Sophia Antipolis, Apr. 11-15, 2016, 5 pages.

ETRI, "Solution for network function selection within a network slice", SA WG2 Meeting #114, Apr. 11-15, 2016, 3 pages, S2-161447.

Samsung, "Roaming Support of Network Slice", SA WG2 Meeting #116BIS, Aug. 29-Sep. 2, 2016, 3 pages, S2-164604.

Supplementary European Search Report dated Apr. 8, 2019 in connection with European Patent Application No. 17 79 9621, 14 pages.

Ericsson, "Update to session establishment procedure", SA WG2 Temporary Document SA WG2 Meeting #114, Apr. 11-15, 2016, S2-161475, 5 pages.

European Search Report dated Jan. 11, 2021 in connection with European Patent Application No. 20 18 8231, 11 pages.

Office Action dated Feb. 22, 2021 in connection with Korean Patent Application No. 10-2018-7036612, 16 pages.

* cited by examiner

ROAMING SUPPORT FOR NEXT GENERATION SLICE ARCHITECTURE

CROSS-REFERENCE TO RELATED APPLICATION AND CLAIM OF PRIORITY

This application claims priority under 35 U.S.C. § 119(e) to U.S. Provisional Patent Application No. 62/337,068 filed on May 16, 2016, U.S. Provisional Patent Application No. 62/373,510 filed on Aug. 11, 2016, and U.S. Provisional Patent Application No. 62/401,611 filed on Sep. 29, 2016. The above-identified provisional patent applications are hereby incorporated by reference in its entirety.

TECHNICAL FIELD

The present disclosure is directed to a roaming architecture for wireless networks. Specifically, the present disclosure is directed to a roaming architecture where a slice selector resides in all networks.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Currently, through service level agreements (SLA), a visiting network will able to identify resources to be assigned in a home network. Using network function interaction capabilities, the visiting network functions will be able to communicate with network functions in the home network. Because network operators are not going to open up their network resources to be assigned and/or visualized by other networks, roaming scenarios requiring assignment of resources in the home network needs to be looked at carefully.

Once resources are assigned, an active protocol data unit (PDU) session is established. Existing standards provide procedures for defining single and multiple PDU sessions establishment using 5G architecture. Procedures do not exist for the modification and release of PDU sessions.

SUMMARY

The present disclosure relates to a pre-$5^{th}$-Generation (5G) or 5G communication system to be provided for supporting higher data rates Beyond $4^{th}$-Generation (4G) communication system such as Long Term Evolution (LTE).

In a first embodiment, a method for operating a core network including a common core network function (CCNF) and a network slice selector (NSS) includes receiving an attach request from a user equipment (UE) at the CCNF and transmitting a slice request from the CCNF to the NSS. The method also includes allocating, by the NSS, at least one network slice. An attach response is transmitted to the UE based on the allocated at least one network slice.

In a second embodiment, a server includes a common core network function (CCNF) and a network slice selector (NSS) coupled to the CCNF. The CCNF is configured to receive an attach request from a user equipment (UE) and transmit a slice request to the NSS. The NSS is configured to allocate at least one network slice. The CCNF is configured to transmit an attach response based on the allocated at least one network slice.

In a third embodiment, a core network includes a home network and a visiting network. The home network includes a first slice selector module configured to select a first slice and network function selection module configured to select a network function within the selected slice. The visiting network includes a second slice selector module configured to communicate with the first slice selector and select a second slice. A CCNF module communicates with the second slice selector module to receive an identity of the first slice and an identity of the second slice and transmits a temporary identifier to a user equipment based on the identity of the first slice and the second slice.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of this disclosure may be implemented in any suitably arranged device or system.

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Figure 1:
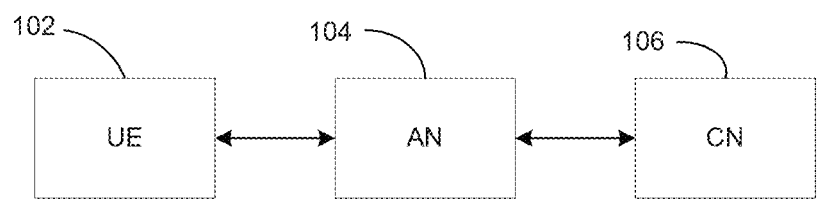
FIG. 1 illustrates an example wireless network according to this disclosure.

FIG. 1 illustrates an example wireless system 100 according to this disclosure. The embodiment of the wireless system 100 shown in FIG. 1 is for illustration only. Other embodiments of the wireless system 100 could be used without departing from the scope of this disclosure.

As shown in FIG. 1, the system 100 includes a user equipment (UE) 102 that represents any suitable computing or processing device that interacts with at least one server or other computing device(s) over a network (not shown). In this example, the UE 102 may include a desktop computer, a mobile telephone or smartphone, a personal digital assistant (PDA), a laptop computer, and a tablet computer. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an access network (AN) 104, whether the UE is a mobile device (such as a mobile telephone or smartphone) or is normally considered a stationary device (such as a desktop computer or vending machine).

AN 104 provides a connection between the UE 102 and a core network (CN) 106. The AN 104 may include a next generation NodeB or gNB. The CN 106 may include different functions for setting up and Routing protocol data units or PDUs. These functions, which will be described below, may include session management functions, policy functions, user plane functions, a network slice selector, a network function selector, a control plane function, a subscriber data management function, etc.

Although FIG. 1 illustrates one example of a wireless system 100, various changes may be made to FIG. 1. For example, the wireless system 100 could include any number of ANs, CNs, and UEs in any suitable arrangement.

Figure 2:
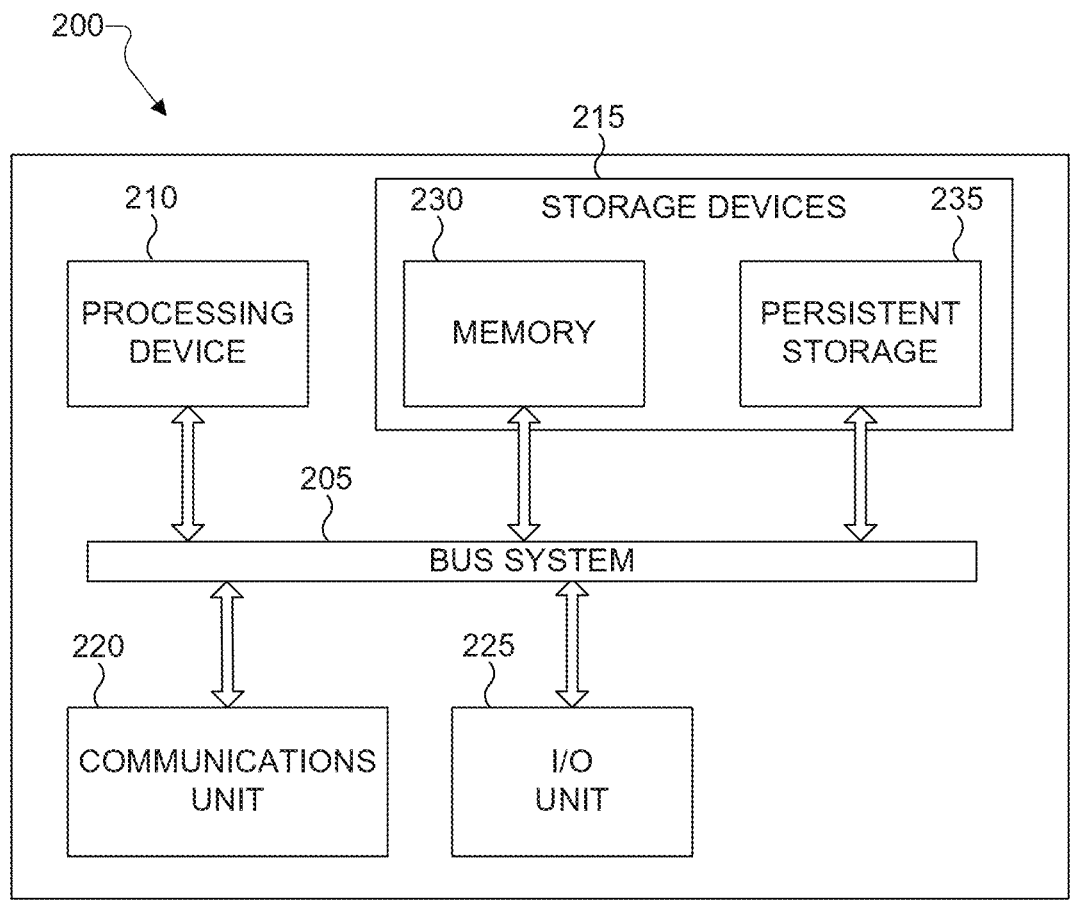
FIGS. 2 and 3 illustrate example devices in a wireless systems according to this disclosure.
Figure 3:
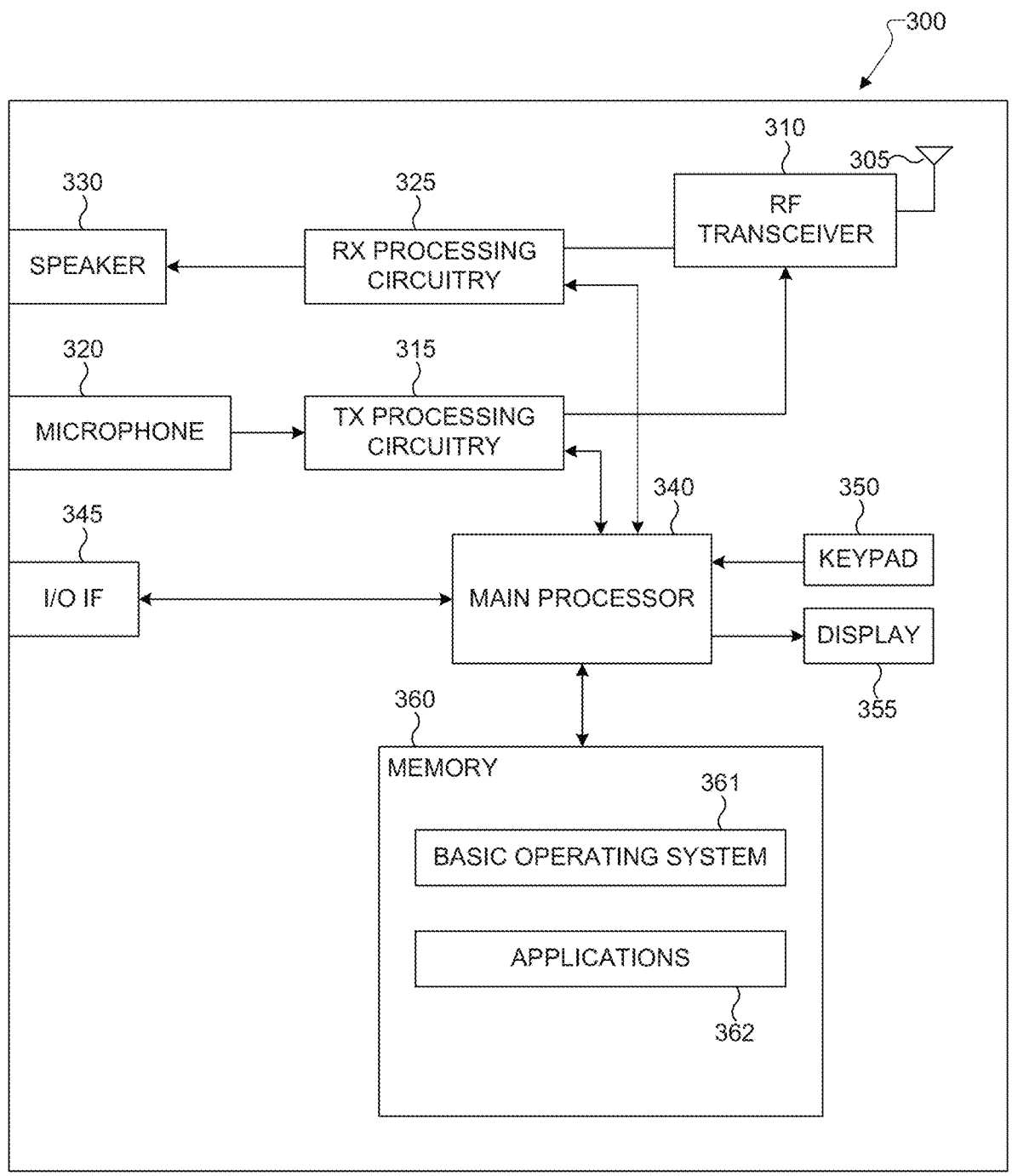

FIGS. 2 and 3 illustrate example devices in a wireless system according to this disclosure. In particular, FIG. 2 illustrates an example server 200, and FIG. 3 illustrates an example UE 300. The server 200 could represent the AN 104 or the CN 106 in FIG. 1, and the UE 300 could represent the UE 102 in FIG. 1.

As shown in FIG. 2, the server 200 includes a bus system 205, which supports communication between at least one processing device 210, at least one storage device 215, at least one communications unit 220, and at least one input/output (I/O) unit 225.

The processing device 210 executes instructions that may be loaded into a memory 230. The processing device 210 may include any suitable number(s) and type(s) of processors or other devices in any suitable arrangement. Example types of processing devices 210 include microprocessors, microcontrollers, digital signal processors, field programmable gate arrays, application specific integrated circuits, and discreet circuitry.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a ready only memory, hard drive, Flash memory, or optical disc.

The communications unit 220 supports communications with other systems or devices. For example, the communications unit 220 could include a network interface card or a wireless transceiver facilitating communications over a network. The communications unit 220 may support communications through any suitable physical or wireless communication link(s).

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

Note that while FIG. 2 is described as representing the AN 104 or CN 106 of FIG. 1, the same or similar structure could be used in the UE 102. For example, a laptop or desktop computer could have the same or similar structure as that shown in FIG. 2.

FIG. 3 illustrates an example UE 300 according to this disclosure. The embodiment of the UE 300 illustrated in FIG. 3 is for illustration only, and the UE 102 of FIG. 1 could have the same or similar configuration. However, UEs come in a wide variety of configurations, and FIG. 3 does not limit the scope of this disclosure to any particular implementation of a UE.

As shown in FIG. 3, the UE 300 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by the AN 104 of the system 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360. The main processor 340 can move data into or out of the memory 360 as required by an executing process. In some embodiments, the main processor 340 is configured to execute the applications 362 based on the OS program 361 or in response to signals received from an AN 104 or an operator. The main processor 340 is also coupled to the I/O interface 345, which provides the UE 116 with the ability to connect to other devices such as laptop computers and handheld computers. The I/O interface 345 is the communication path between these accessories and the main processor 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

The embodiments described herein are directed to a roaming architecture where slice (instance) selector (NSS) resides in all networks. In a roaming scenario where home routed services support is required, the NSS also exists in the home network. This function is a separate function entity from other common control network functions (CCNF). The NSS is responsible for selecting an appropriate slice instance in its network taking in the account of existing traffic situation, resources available, policy, subscription information etc.

A slice instance or slice is a grouping of physical or virtual resources which can act as a sub network and/or cloud and it can accommodate service components and network (virtual) functions. For slice creation, management planes create virtual or physical network functions and connects them as appropriate and instantiate all the network functions assigned to the slice. In other situations, for slice creation, the slice control takes over the control of all the virtualized network functions and network programmability functions assigned to the slice, and (re-)configure them as appropriate to provide the end-to-end service.

Once the slice (instance) is selected, this information may be stored by the slice selector or it can be passed to the CCNF. Subsequent or piggybacked service request from the end device triggers communication with the network functions within slice. The embodiments described herein provide an allocation of resources in the visiting and home network for roaming scenarios.

In the embodiments described herein, the network supports multiple control functions which may be common functions used by other slice instances or they are specific to particular type of slice only. The present disclosure does not have dependency whether the network support group A, B or C described in the annex of 3GPP SA2 23.799 TR, which is herein incorporated by reference.

A new attach request received from a UE may include a device type, a device identity, a service type, and additional information allowing an Access Network (AN) to make an appropriate choice of a Common Control Network Function (CCNF). A temporary identifier will be provided by the serving CCNF as a part of response to an initial attach which will be used to identify that CCNF for all subsequent service requests from that end device or UE. The communication to/from may be done via a Non-Access Stratum (NAS) router or via a Access and Mobility Management Function (AMF) which are part of the CCNF. Subscription information is available in the network which will be part of slice instance selection along with the service requested by that device in home network (HPLMN) and also in visiting network (VPLMN). The authentication/authorization of the end device will be performed in the visiting network (VPLMN) prior to slice selection. A Network Slice Selector (NSS) could be co-located with CCNF or it could also be standalone entity in the HPLMN and/or the VPLMN.

Figure 4:
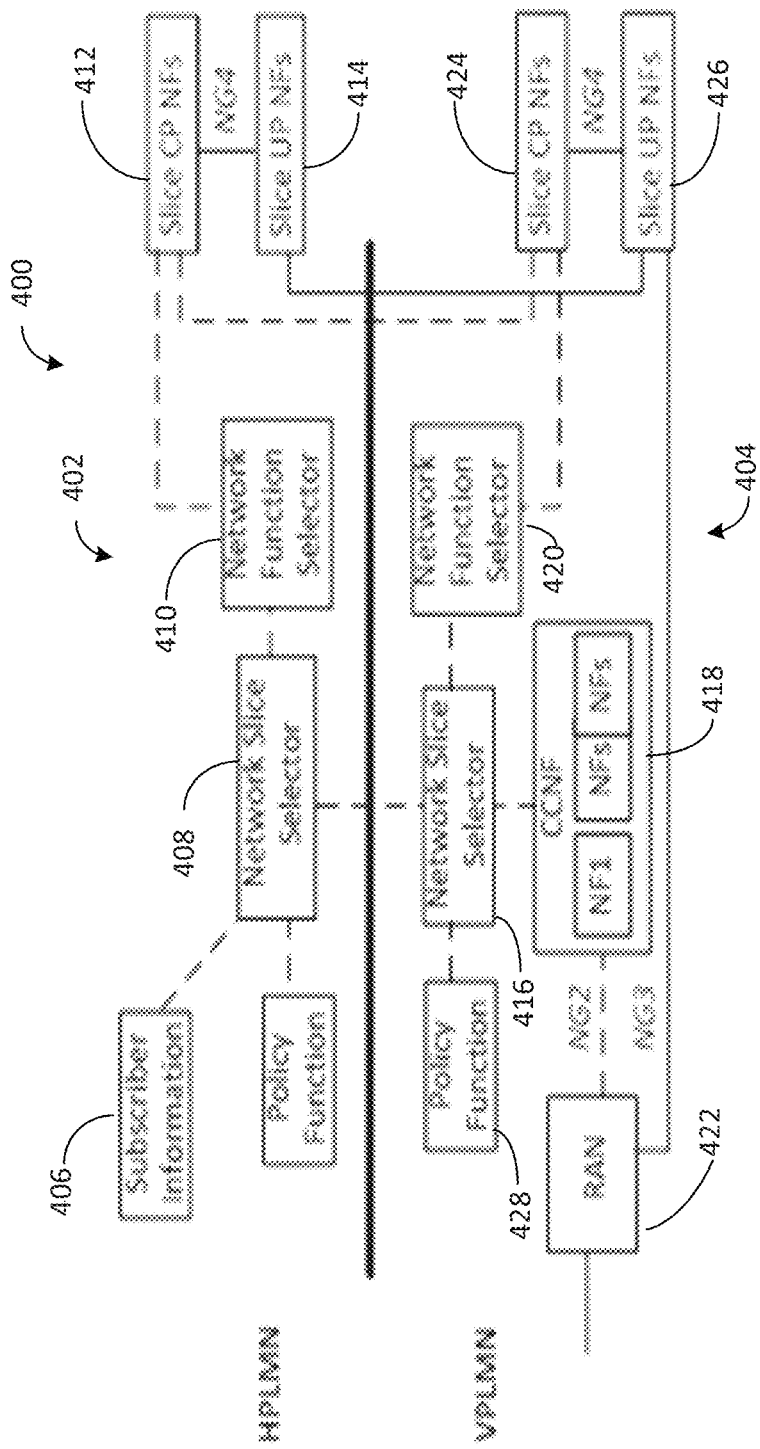
FIG. 4 illustrates an example roaming architecture according to this disclosure.

FIG. 4 illustrates an example roaming architecture or system 400 according to this disclosure. The system 400 includes a home network 402 and visiting network 404. The home network 402 includes a subscriber information module 406, a network slice selector (NSS) module 408, and a network function selector (NFS) module 410. The visiting network 404 includes a NSS module 416, a CCNF module 418, and a NFS module 420. Modules 406 to 420 may be implemented by a processor on a core network such as processing device 210 of FIG. 2. Certain functions that are common to the home network and the visiting network may be performed by the CCNF module 418 such as an AMF and an authentication management field function or an authenticator function. The system also includes a radio access network (RAN) 422 that connects a UE to the visiting network 404.

In an embodiment, the NSS module 408 in the home network 402 is responsible for selecting an appropriate slice instance for the requested service by a UE. Once the slice instance is selected, it is up to the NFS 410 to select/assign slice specific Control Plane Network Functions (CPNFs) 412 such as a session manager. Similarly, some of these CPNFs will be responsible for selecting specific User Plane Network Functions (UPNFs) 414 based on the location of the UE, traffic condition etc.

The NFS module 410 in the home network 402 may be a part of a CCNF, a part of the slice instance, or may be co-located with the NSS module 408. The NFS module 410 is responsible for selecting appropriate network functions for a selected slice instance. If NSS module 408 is a standalone entity or a part of CCNF, there may be an explicit messaging standard defined between the NSS module 408 and the NFS module 410 upon receipt of a new service establishment request from the UE. In the embodiment described herein, both these entities are collocated and hence messages are not shown between them although they are not precluded.

Figure 5:
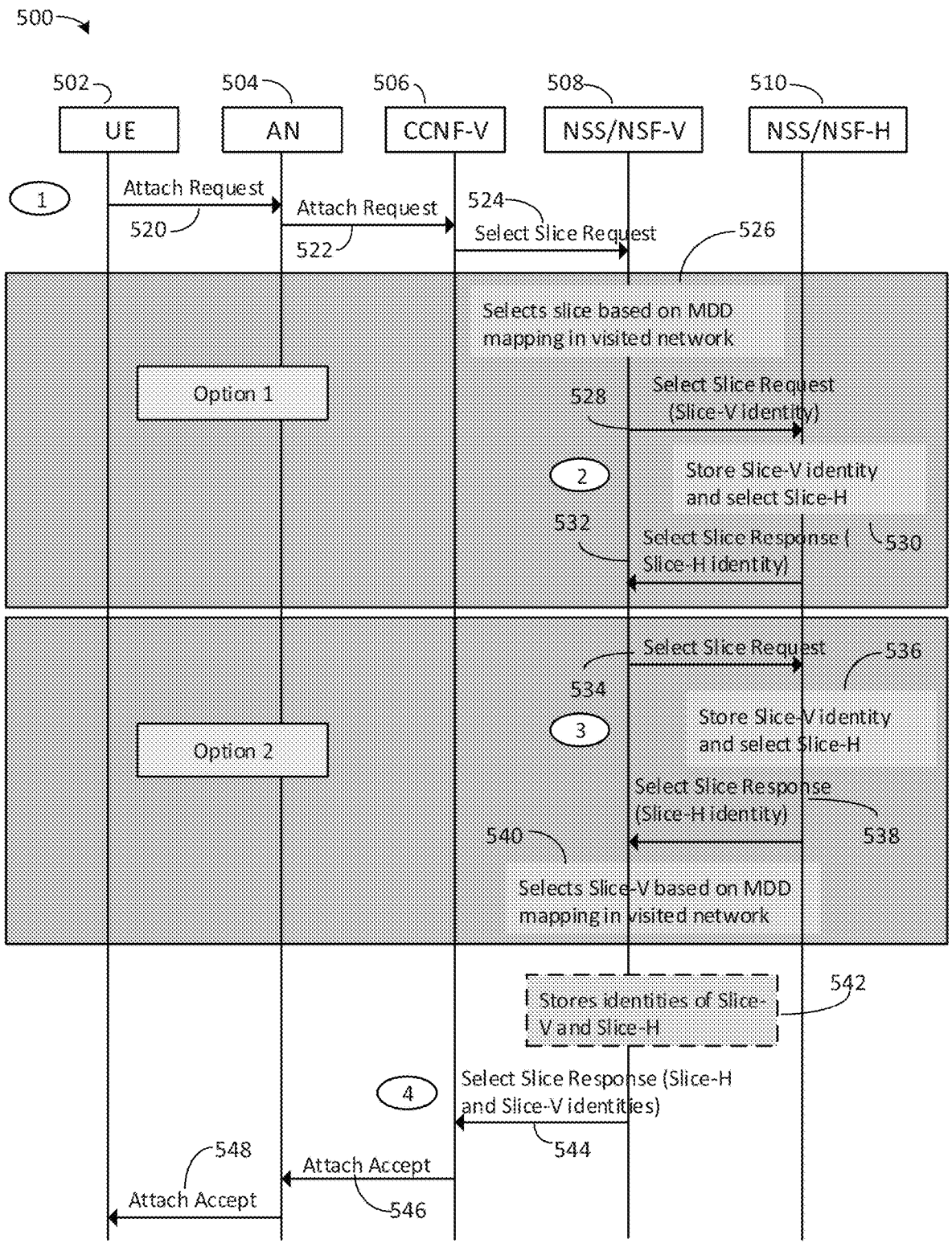
FIG. 5 illustrates an example attach procedure for a home routed roaming scenario according to this disclosure.

FIG. 5 illustrates an example attach procedure 500 for a home routed roaming scenario according to this disclosure. As shown in FIG. 5, the attach procedure 500 begins when a UE 502 transmits an attach request (520) to AN 504. The AN 504 then selects an appropriate CCNF in a visiting network (CCNF-V) 506 based on multi-descriptor (MDD) information included in the attach request 520. The AN 504 then transmits the attach request (522) to the selected CCNF-V 506. The CCNF-V 506 analyzes the received attach request and authenticates and/or authorizes the UE. The CCNF-V then forwards select slice request to the Network Slice Selector in the visiting network (NSS-V). Based on the subscription information that may reside in subscriber information module 406 (FIG. 4), the NSS-V 508 determines that the UE 502 is a roamer and hence it sends out the select slice request to the NSS-H. The selection of the NSS-H is based on the information pre-configured as a part of service level agreement (SLA). This information may be stored in the network slice instance (NSI) of the visiting network, subscriber information module 406, a policy function module 428 or in an external entity managing the SLA.

The procedure 500 includes two options for allocating an NSI first. In option 1, upon receipt of slice select request from the CCNF-V 506, the NSS-V 508 selects a slice (526) based on the criteria such as mapped MDD, subscription information, and/or network policy. The selected slice instance identity is sent (528) to the NSS in the home network (NSS-H) 510. Routing information is obtained based on the local configuration per the SLA. The receiving NSS-H 510 also selects a corresponding slice (530) based on the requested MDD, subscription information, and/or network policy etc. The identity of the selected slice is sent (532) to the NSS-V 508.

In option 2, upon receipt of slice select request from the CCNF-V 506, the NSS-V 508 sends a slice select request (534) to the NSS-H 510. Routing information is obtained based on the local configuration per the SLA. The receiving NSS-H 510 also selects a corresponding slice (536) based on the requested MDD, subscription information, and/or network policy etc. The identity of the selected slice is sent (538) to the NSS-V 508. Upon receipt of this information, the NSS-V 508 selects a slice in the visiting network (540).

The NSS-V stores (542) the context of the assigned slice and responds to the CCNF-V 506 with select slice response (544). At that time, it may include information of the slice identity. The CCNF-V 506 assigns a temporary identifier which is included in the attach response (546) sent to the AN 504 which then forwards this message (548) to the UE 502. The UE 502 is expected to send this temporary identifier in all subsequent service requests.

Figure 6A:
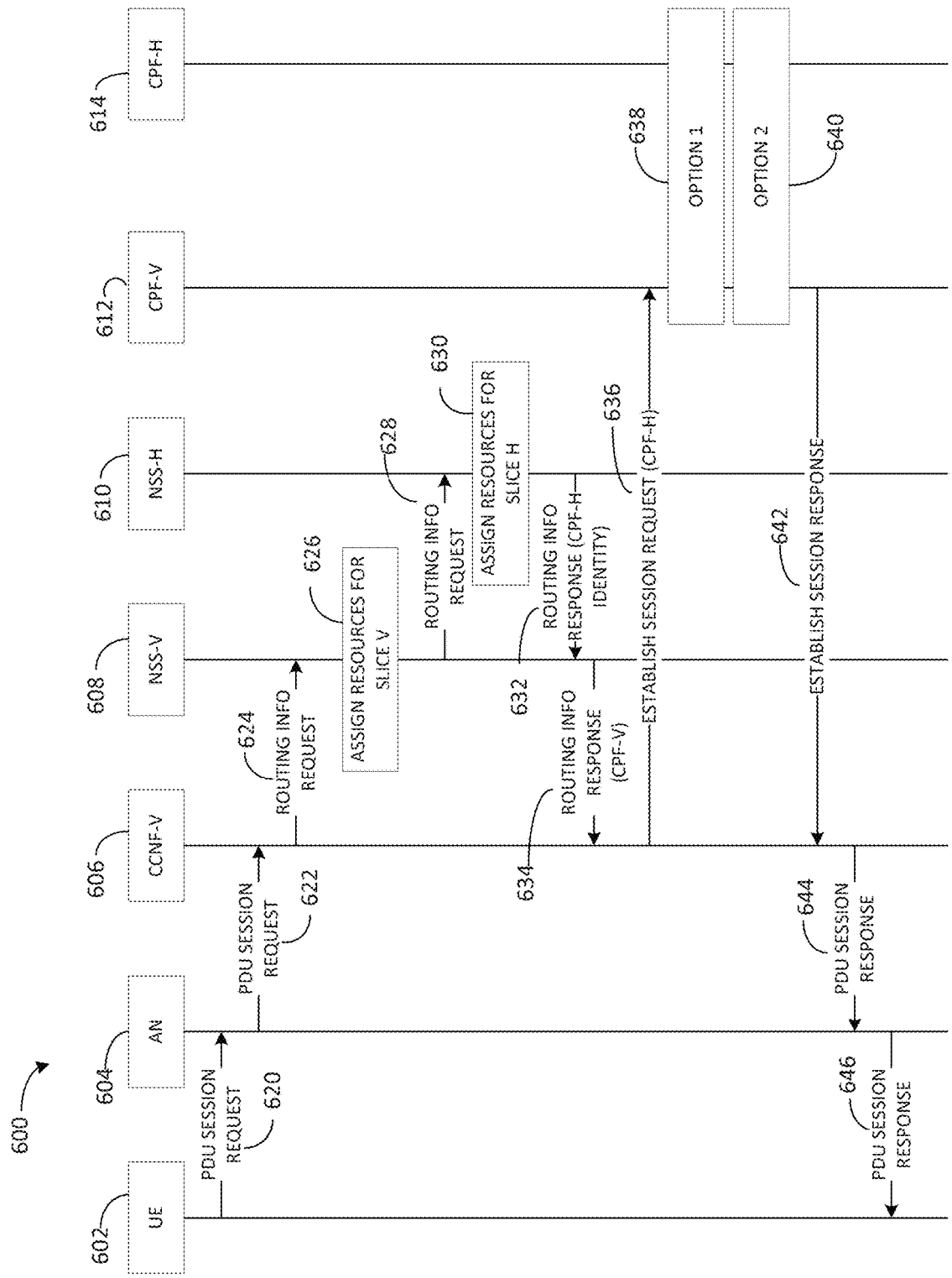
FIGS. 6A and 6B illustrate an example procedure for a subsequent service request for the home routed roaming scenario according to this disclosure.
Figure 6B:
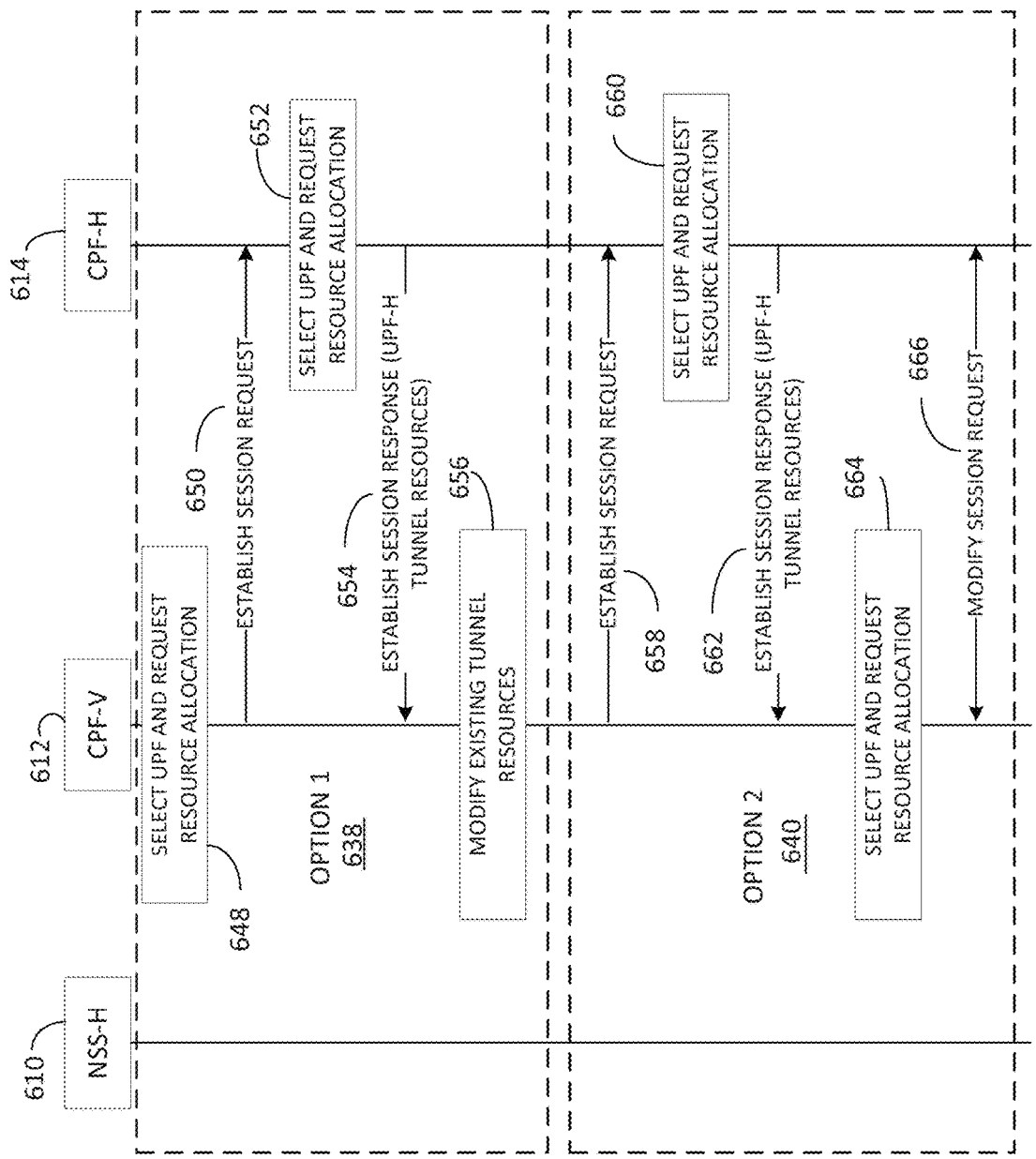

FIGS. 6A and 6B illustrate an example procedure 600 for a subsequent service request for the home routed roaming scenario according to this disclosure. Procedure 600 may be performed after the attach procedure 500 is performed successfully. In procedure 600, as part of new service request, the UE 602 sends a protocol data unit (PDU) session request (620) to the core network along with the temporary identifier which was assigned during the attach procedure 500. This request is forwarded by the AN 604 to the CCNF-V 606 based on the temporary identifier (622).

Upon receipt of this PDU session request, the CCNF-V requests routing information (624) from the NSS-V 608. The NSS-V 608 assigns resources (626) for control entities of the previously selected slice. At the same time, the NSS-V 608 also requests assignment of resources from the NSS-H 610 (628). The NSS-H 610 assigns resources (630) for control entities of the previously selected slice and provides routing information including a control plane function in the home network (CPF-H) identity (632) in the response after successful assignment of resources. Once a response is received from the NSS-H 610, the NSS-V 608 provides the routing information including an identity of the selected control plane function in the visiting network (CPF-V) and also a slice instance identity in the visiting network to the CCNF-V 606 (634). The assignment of the resources in the visiting network and home network may be done in any order. The CCNF-V 606 forwards the PDU session request (636) to the CPF-V 612. At that time there are two operations 638 and 640 that may be implemented, which will be discussed below with reference to FIG. 6B, based on whether CPF-V 612 decides to assign resources locally first and then request for the resource assignment in the home network or vice-a-versa.

After the resources are assigned, the CPF-V 612 responds to the functional entity within the CCNF-V 606 which had sent the establish session request earlier (642). The response of the PDU session request is sent (644) to the AN 604 by the CCNF-V 606 which then forwards the response to the UE 602 (646).

FIG. 6B illustrates operations 638 and 640 of FIG. 6A. As shown in FIG. 6B, in operation 638, the CPF-V 612 selects a corresponding user plane function (648) based on criteria such as location of the UE 602, current traffic condition, etc. The CPF-V 612 then sends an establish session request message (650) to the CPF-H 614 along with UPF-V's tunnel resources. The CPF-H 614 responds along with UPF-H's tunnel resources (654) after the successful assignment of resources (652). The CPF-V 612 then requests modification of the session to the UPF-V along with the tunnel resources obtained from the CPF-H (656).

In operation 640, the CPF-V 612 sends an establish session request message (658) to the CPF-H 614 requesting it to assign resources. Upon receipt of this request, the CPF-H 614 selects a corresponding UPF and assigns resources based on the local policy (660). The response (662) is sent to the CPF-V 612 after successful assignment of resources along with the UPF-H's tunnel resources. Once this response is received at the CPF-V 612, the CPF-V 612 selects the corresponding UPF and resource allocation (664) based on the criteria such as location of the end device, current traffic condition etc. The information of the UPF-H's tunnel resources is also sent to the UPF-V at that time. The CPF-V 612 sends UPF-V's tunnel resources to the CPF-H 614 which then request UPF-H session modification (666).

Figure 7:
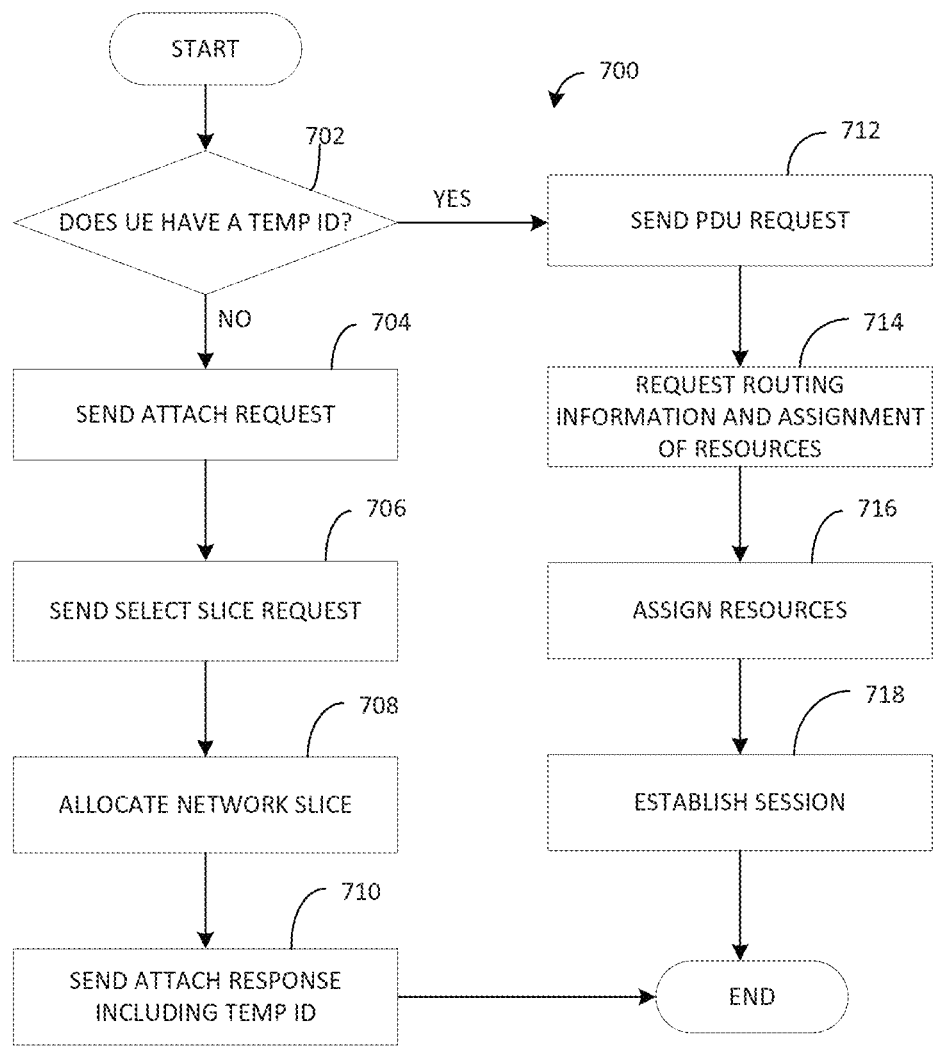
FIG. 7 illustrates an example method according to this disclosure.

FIG. 7 illustrates an example method 700 for a roaming scenario according to this disclosure. The method of FIG. 7 will be discussed while making reference to system 400 of FIG. 4. As shown in FIG. 7, the method of 700 determines if an attach procedure request from a UE is an initial request or a subsequent request after the UE has successfully been attached by determining if the UE includes a temporary identification in operation 702.

If the UE does not have a temporary identification, the method 700 proceeds to operation 704 where the attach request is received by the CCNF 418 from the RAN 422. If this CCNF 418 is a default CCNF, after analyzing the received request, the request is forwarded to the specific CCNF if needed, based on the type of service requested. The address of the NSS 416 is pre-configured with the CCNF 418. Once authentication and/or authorization is completed, the CCNF 418 forwards a select slice request to the NSS 416 in operation 706.

In operation 708, a network slice is allocated. The network slice may be allocated in one of two options. In a first option, upon receipt of the select slice request from the CCNF 418, the NSS 416 selects a slice in the visiting network based on the criteria such as mapped MDD, subscription information, network policy. The selected slice identity is sent to the NSS 408. Routing information is obtained based on the local configuration per the SLA. The routing information for the NSS 408 may be stored in NSS 416, subscriber information module 406, or policy function 428. The NSS 408 also selects corresponding slice based on the requested MDD, subscription information, network policy etc. The identity of the selected slice instance is sent to the NSS 416.

In a second option, upon receipt of select slice request from the CCNF 418, the NSS 416 sends a select slice request to the NSS 408. Routing information is obtained based on the local configuration per SLA. The NSS 408 also selects a corresponding slice based on the requested MDD, subscription information, network policy etc. The identity of the selected slice is sent to the NSS 416. Upon receipt of this information, the NSS 416 selects a slice instance in the visited network.

In operation 710, the NSS 416 stores the context of the assigned slice and respond to the CCNF 418 with select slice response. At that time, it may include information of the slice identity. The CCNF 418 assigns a temporary identifier which is included in the attach response sent to the RAN 422 which then forwards this message to the UE. The UE sends this temporary identifier in all subsequent service requests.

If the UE has a temporary identification, the method 700 proceeds to operation 712 where, as a part of new service request, the UE sends a PDU session request to the core network along with the temporary identifier. This request is forwarded by the RAN 422 to the CCNF 418 based on this temporary identifier.

In operation 714, the CCNF 418 requests routing information from the NSS 416. The NSS 416 is the NSS that assigned resources for control entities of a previously selected slice. At the same time, it also requests assignment of resources from the NSS 408. The NSS 408 provides control plane network function (CPNF) 412 in the response after successful assignment of resources. Once the response is received from the NSS 408, the NSS 416 provides the identity of a selected control entity (CPF-V) and also slice identity in the visiting network to the CCNF 418. Note that assignment of the resources in the visiting network and home network may be done in any order.

In operation 716, the CCNF 418 forwards the PDU service request to a CPNF 424. At that time there are two options based on whether CPNF 424 decides to assign resources locally first and then request for the resource assignment in the home network or vice-a-versa. In a first option, the CPNF 424 selects a corresponding user plane network function (UPNF) 426 based on the criteria such as location of the end device, current traffic condition etc. The CPNF 424 then sends an establish session request message to the CPNF 412 along with the tunnel resources of UPNF 426. The CPNF 412 responds along with the tunnel resources of UPNF 414 after successful assignment of resources. The CPNF 424 then requests modification of the session to the UPNF 426 along with the tunnel resources obtained from the CPNF 412.

In a second option, the CPNF 424 sends an establish session request message to the CPNF 412 requesting it to assign resources. Upon receipt of this request, the CPNF 412 selects a corresponding UPNF 414 based on the local policy. The response is sent to the CPNF 424 after successful assignment of resources along with the tunnel resources of UPNF 414. Once this response is received at the CPNF 424, it selects corresponding UPNF 426 based on the criteria such as location of the end device, current traffic condition etc. The information of the tunnel resources of UPNF 414 is also sent to the UPNF 426 at that time. The CPNF 424 sends the tunnel resources of the UPNF 426 to the CPNF 412 which then request a UPNF 414 session modification.

In operation 718, the CPNF 424 responds to the functional entity within CCNF 418 which had sent the establish session request earlier. The response of the PDU session request is sent to the RAN 422 by the CCNF 418 which then forwards the response to the UE.

In some embodiments, the home network 402 may not support slice architecture. In such embodiments, the address of a control entity such as the NFS 408, a session management (SM) function, or a gateway control plane entity (not shown) supporting requests from the external entity in the home network 402 is provisioned in the visiting network 404. If a gateway control plane entity is used, further messaging may be required to identify responsible control plane functions 412 in the home network 402 which may be based on certain local criteria defined in the home network 402. The operations in FIGS. 5 and 6 would remain substantially the same except for the functions of the NSS-H and CPH-H would be replaced by the control entity.

Figure 8:
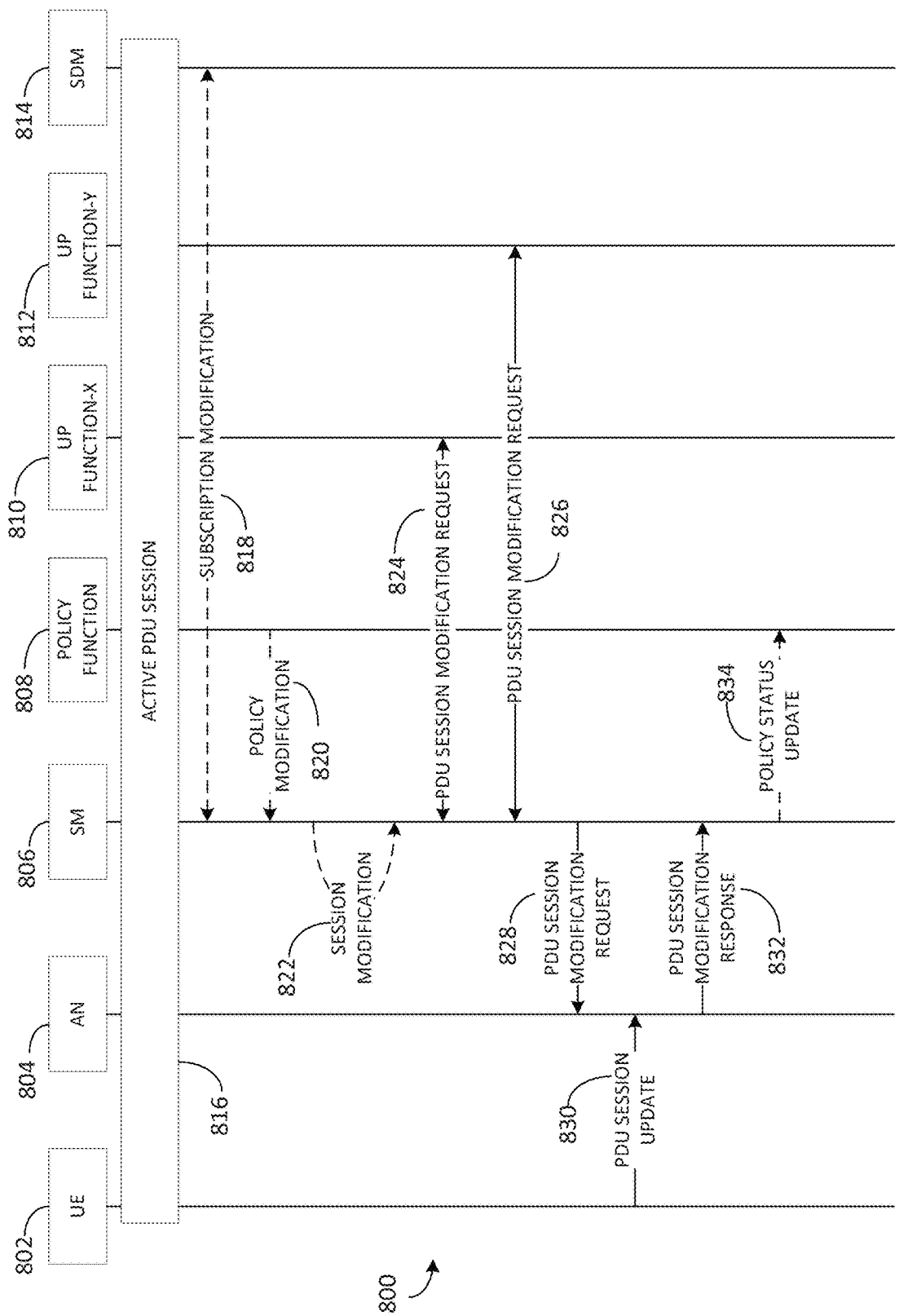
FIG. 8 illustrates an example procedure of a session modification triggered by a session management (SM) according to this disclosure.
Figure 9:
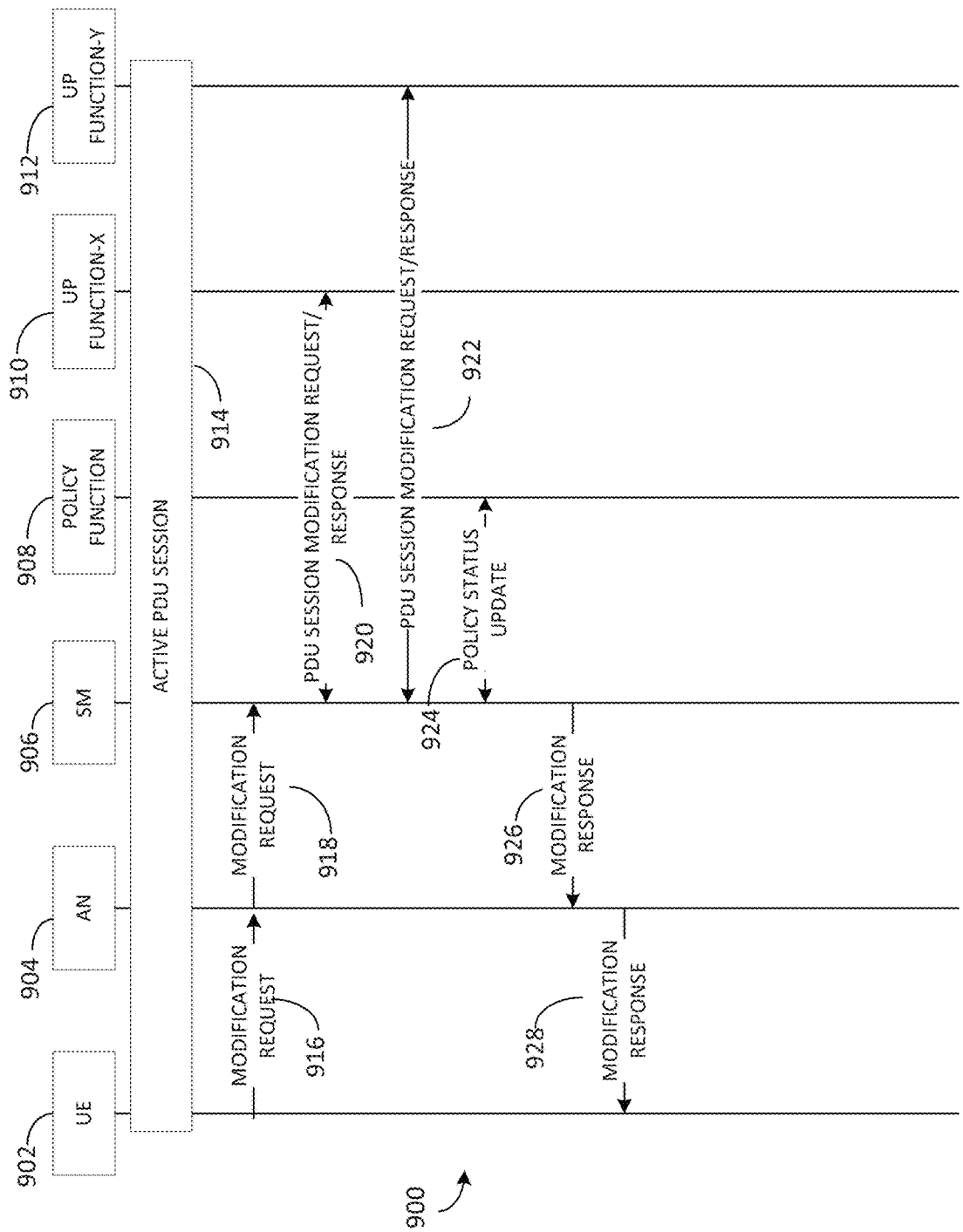
FIG. 9 illustrates an example procedure of the session modification triggered by a UE according to this disclosure.

Once a PDU session is established, a UE may request a modification or release of a PDU session. In some embodiments, the session modification may be requested by different network entities as shown in FIGS. 8 and 9. In one embodiment, in order to modify existing policy rules, a user plane (UP) function may use a Quality of Service (QoS) policy to determine that the authorized QoS of a service data flow has changed or that a service data flow shall be aggregated to or removed from an active bearer. A policy function communicates with a session management (SM) function for the updates. The UP function updates packet filtering information to match the traffic flow aggregate once notified by the SM. In another embodiments, to modify subscription information while in the middle of active PDU session, the subscriber data is updated for QoS parameters. In this case, the SM function is notified of the change by the subscriber data management (SDM) function. In another embodiment, to modifying resources managed by the SM may include the case where the need for a session modification may result from service execution logic or internal processing at the SM. In yet another embodiment, for the modifications of bearer resources by the UE, the UE may request for a modification of bearer resources for an active traffic flow aggregate with a specific QoS demand. This modification request is handled by the SM.

FIG. 8 illustrates an example procedure 800 of the session modification triggered by an SM according to this disclosure. As shown in FIG. 8, the UE 802 has one or more active PDU sessions (816). SDM 814 may request a session modification (818) which includes subscription information and also subscribed data. Depending on which subscribed data has changed, the session modification may or may not require QoS update. Upon receipt of this request from the SDM 814, the SM 806 sends an acknowledgement to the SDM 814. Also, if there are any modifications done by the policy function 808 for one or more sessions managed by the SM 806 for the UE, the policy function 808 will communicate with the SM (820). In some embodiments, the need for a session modification may be resulted from the service execution logic or internal processing at the SM (822). The SM 806 communicates with UP function-X 810 (824) and communicates with UP-function-Y 812 (826) regarding the requested session modification.

The SM 806 notifies the AN 804 along with the modified QoS information (828). The AN 804 maps the received QoS information with the access specific QoS. The AN 804 communicates with the UE 802 where UE 802 may reconfigure the connection if necessary and respond to the AN 804 (830). The AN 804 responds to the SM 806 with the update status (832). Upon receipt of the response from the AN 804, the SM 806 notifies the policy function 808 regarding the policy status of the modified PDU session(s) (834).

FIG. 9 illustrates an example procedure 900 of a session modification triggered by a UE according to this disclosure. As shown in FIG. 9, the UE 902 has one or more active PDU sessions (914). The UE 902 requests (916) modification of an active traffic flow aggregated with a specific QoS demand. The AN 904 forwards the request to the SM 906 (918). Upon receipt of the modification request, the SM 906 sends a PDU session modification request to UP function-X 910 (920) and UP-function-Y 912 (922). After receiving a response from the UP function(s), the SM 906 function communicates with the policy function 908 (924) regarding the policy status updates. The SM 906 notifies the AN 904 regarding the modified QoS information (926). The AN 904 maps the received QoS information with the access specific QoS and then sends a modification response to the UE 902 (928).

Figure 10:
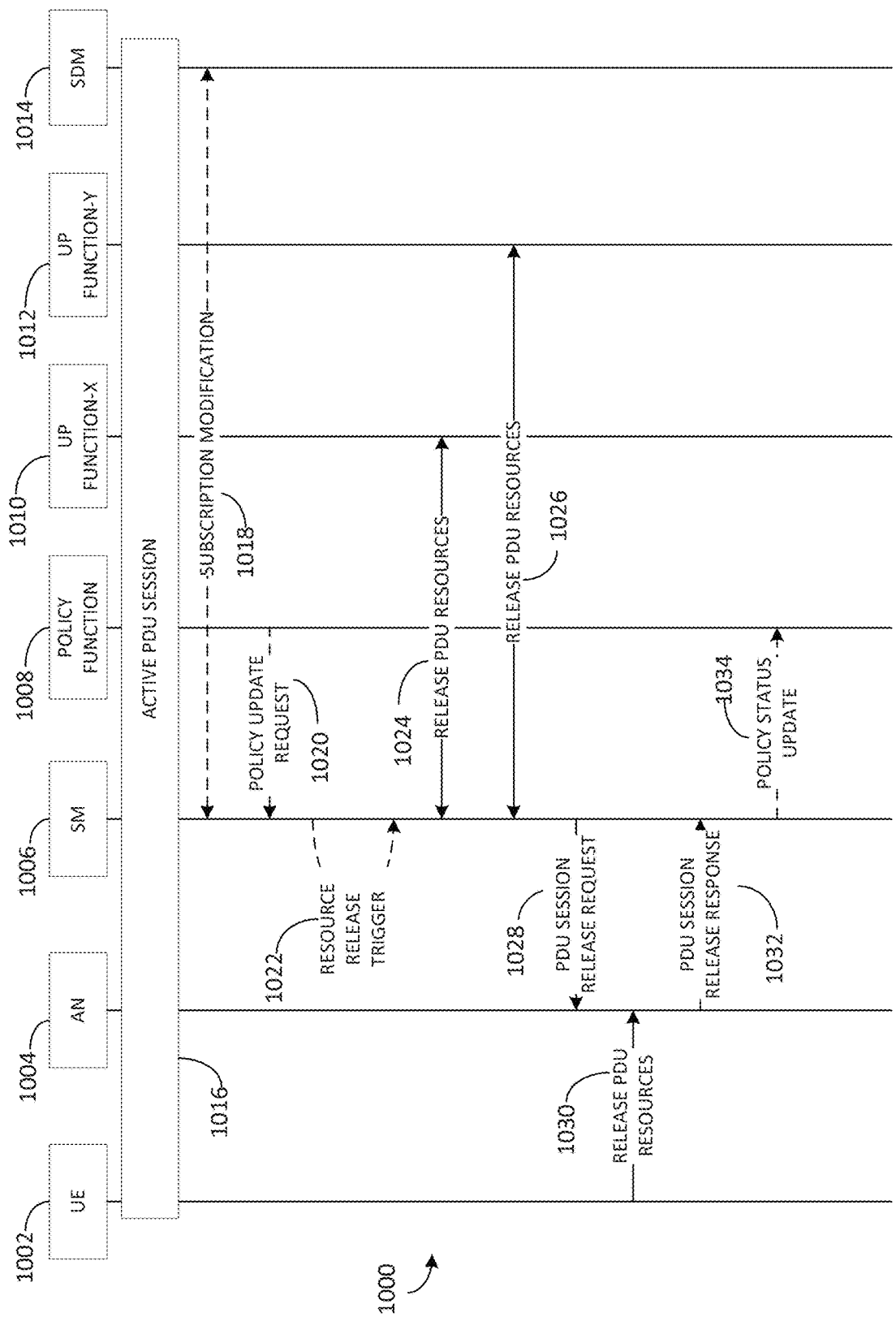
FIG. 10 illustrates an example procedure of a release of a session triggered by an SM according to this disclosure.
Figure 11:
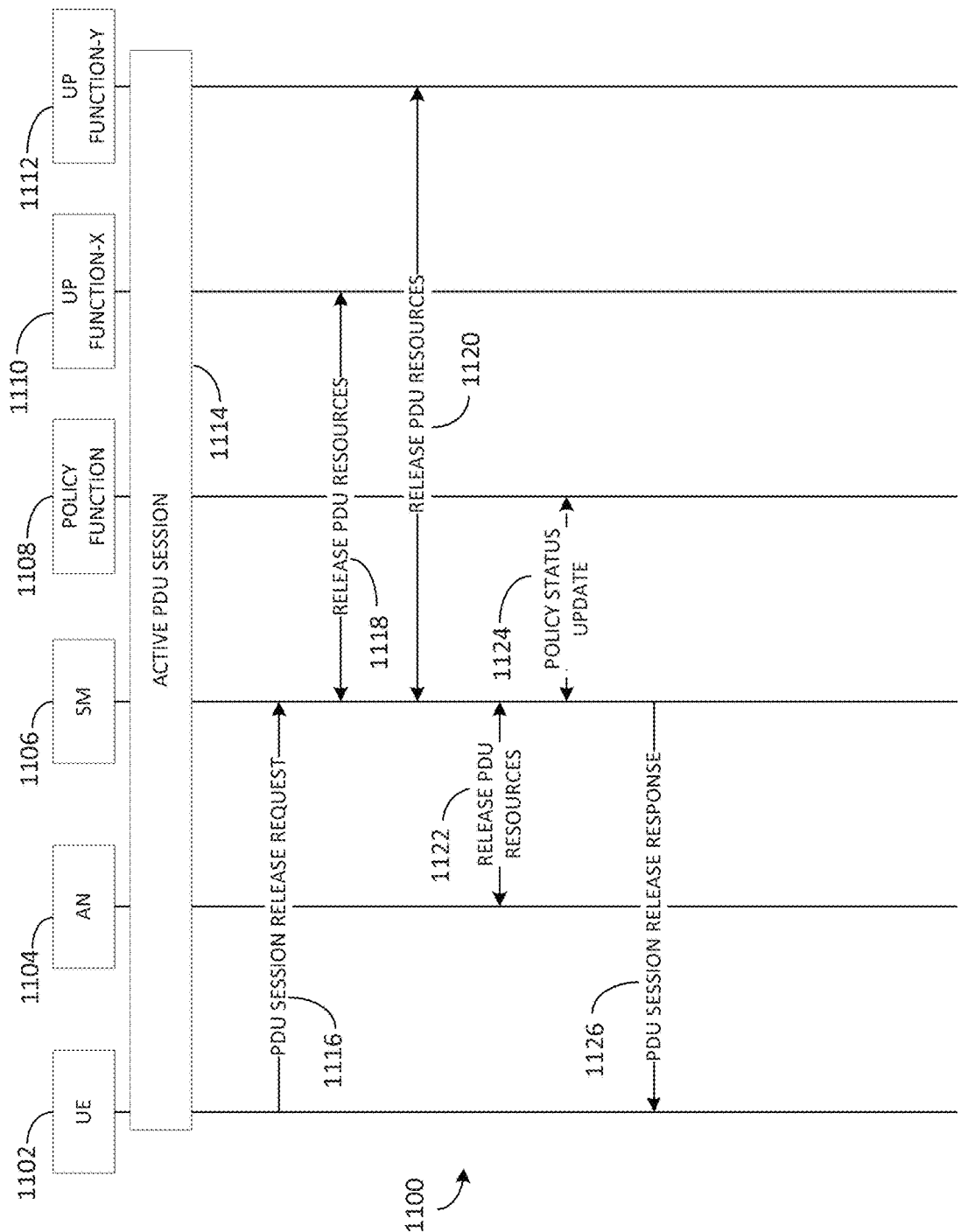
FIG. 11 illustrates an example procedure of a release of a session triggered by a UE according to this disclosure.

In some embodiments, a session release may be requested by different network entities as shown in FIGS. 10 and 11. In one embodiment, the operator may request removal of active sessions associated with specific subscriber. In this case, the SM is notified of the change by the SDM function. In another embodiment, if there is no activity for a longer time for an active session, the timer monitoring the session at the SM expires which triggers a session release at the SM. In other embodiments, the user may initiate release of the session which is handled by the SM or the SM processes a session release request received from a peer. In yet another embodiment, the session is released due to service execution state imposed by a policy function.

FIG. 10 illustrates an example procedure 1000 for a release of a session triggered by the SM according to this disclosure. As shown in FIG. 10, the UE 1002 has multiple active PDU sessions (1016). An SM 1006 initiates a session release request for one or more than one PDU sessions toward the UE 1002. This trigger may be resulted from the processing at the SM (1022), requested by the SDM 1014 (1018), based on the operator policy by the policy function 1008 (1020), or requested by the peer entity. This step may be combined with the detach procedure based on decision taken by the SM 1006 using the service type associated with these PDU sessions and subscription information. The SM 1006 communicates with UP function-X 1010 (1024) and communicates with UP-function-Y 1012 (1026) involved in active PDU sessions that are to be released and requests them to release resources. Upon receiving response(s) from the impacted UP functions, the SM 1006 requests the AN 1004 for release of access resources at that time for targeted session(s) (1028). The UE 1002 is requested to release the PDU sessions and once the resources of these sessions are released (1030), the SM 1006 receives the response from the AN 1004 (1032). The SM 1006 notifies the policy function of changes of a policy status for the sessions which were released (1034).

FIG. 11 illustrates an example procedure 1100 of a release of a session triggered by a UE according to this disclosure. As shown in FIG. 11, the UE 1102 is has multiple active PDU sessions (1114). The UE 1102 initiates a PDU session release request (1116) toward a SM 1106 for one or more active PDU sessions. This step may be combined with the detach procedure based on decision taken by the SM 1106 using the service type associated with these PDU sessions and subscription information. The SM 1106 communicates with UP function-X 1110 (1118) and UP-function-Y 1112 (1120) requesting release of the resources for their respective PDU sessions. The SM 1106 also explicitly requests the AN 1104 for release of access resources at that time (1122). Upon receipt of the response from the AN 1104 confirming release of resources, the SM 1106 notifies change of session status to the policy function (1124) and the UE 1102 is informed of the completion of the PDU session release (1126).

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for operating a core network including a common core network function (CCNF) and a network slice selector (NSS), the method comprising:
    receiving an attach request from a user equipment (UE) at the CCNF in a visited network providing a roaming service for a home network;
    transmitting a slice request from the CCNF in the visited network to the NSS in the visited network;
    transmitting, from the NSS in the visited network, the slice request to a home NSS in the home network;
    receiving, by the NSS in the visited network from the home NSS in the home network, a response to the slice request that includes an identity of a home network slice selected by the home NSS in the home network based on the slice request;
    selecting, by the NSS in the visited network, based on criteria included in the slice request from the CCNF, at least one network slice in the visited network that corresponds to the home network slice; and
    transmitting, by the CCNF in the visited network, an attach response to the UE based on the selected at least one network slice in the visited network and the home network slice.

2. The method of claim 1, wherein the CCNF receives the attach request from the UE through an access network.

3. The method of claim 1, wherein the CCNF authenticates or authorizes the attach request before transmitting the slice request.

4. The method of claim 1, wherein selecting, by the NSS in the visited network, the at least one network slice in the visited network comprises:
    selecting a first slice in the visited network based on multi-descriptor information;
    transmitting the slice request to the home NSS in the home network after selecting the first slice; and
    receiving, from the home NSS in the home network in response to the slice request, the identity of the home network slice that corresponds to the first slice.

5. The method of claim 1, wherein selecting, by the NSS in the visited network, the at least one network slice in the visited network comprises:
    selecting, after receiving the identity of the home network slice, a second slice in the visited network corresponding to the home network slice based on multi-descriptor information.

6. The method of claim 1, wherein the attach response includes a temporary identification.

7. The method of claim 1, further comprising:
    receiving a protocol data unit (PDU) session establishment request at the CCNF;
    transmitting a request to the NSS for routing information;
    receiving a response to the request from the NSS; and
    establishing a PDU session based on the at least one network slice or another network slice.

8. The method of claim 7, wherein the response includes an identity of at least one control plane function.

9. The method of claim 1, wherein selecting the at least one network slice in the visited network by the NSS in the visited network comprises:
    selecting a first slice in the visited network based on multi-descriptor information;
    transmitting a request to a control entity in a home network; and
    receiving an identity of the home network slice corresponding to the first slice from the control entity in the home network.

10. A server comprising:
    a common core network function (CCNF) in a visited network providing a roaming service for a home network; and
    a network slice selector (NSS) coupled to the CCNF in the visited network,
    wherein the CCNF in the visited network is configured to:
        receive an attach request from a user equipment (UE), and
        transmit a slice request to the NSS in the visited network,
    wherein the NSS in the visited network is configured to:
        transmit the slice request to a home NSS in the home network,
        receive, from the home NSS in the home network, a response to the slice request that includes an identity of a home network slice selected by the home NSS in the home network based on the slice request, and
select, based on criteria included in the slice request, at least one network slice in the visited network that corresponds to the home network slice, and wherein the CCNF in the visited network is configured to transmit an attach response based on the selected at least one network slice in the visited network and the home network slice.

11. The server of claim 10, wherein the CCNF is configured to receive the attach request from the UE through an access network.

12. The server of claim 10, wherein the CCNF is configured to authenticate or authorize the attach request before transmitting the slice request.

13. The server of claim 10, wherein selecting the at least one network slice in the visited network comprises:
   selecting a first slice in the visited network based on multi-descriptor information;
   transmitting the slice request to the home NSS in the home network after selecting the first slice; and
   receiving, from the NSS in the home network in response to the slice request, the identity of the home network slice that corresponds to the first slice.

14. The server of claim 10, wherein the NSS in the visited network is further configured to:
   select, after receiving the identity of the home network slice, a second slice in the visited network corresponding to the home network slice based on multi-descriptor information.

15. The server of claim 10, wherein the attach response includes a temporary identification.

16. The server of claim 10, wherein the CCNF is further configured to:
   receive a protocol data unit (PDU) session establishment request at the CCNF;
   transmit a request to the NSS for routing information;
   receive a response to the request from the NSS; and
   establish a PDU session based on the at least one network slice or another network slice.

* * * * *